United States Patent
Hawes

(10) Patent No.: US 6,471,228 B2
(45) Date of Patent: Oct. 29, 2002

(54) OFFSET MOUNTING BRACKET

(75) Inventor: Timothy R. Hawes, Muskegon, MI (US)

(73) Assignee: Fleet Engineers, Incorporated, Muskegon, MI (US)

( * ) Notice: Subject to any disclaimer, the term of this patent is extended or adjusted under 35 U.S.C. 154(b) by 0 days.

(21) Appl. No.: 09/738,566

(22) Filed: Dec. 15, 2000

(65) Prior Publication Data

US 2002/0020983 A1 Feb. 21, 2002

Related U.S. Application Data

(60) Provisional application No. 60/171,339, filed on Dec. 21, 1999.

(51) Int. Cl.[7] ............................................. B62D 25/16
(52) U.S. Cl. ........................ 280/154; 248/352; 403/230
(58) Field of Search ................................ 403/199, 230, 403/362; 280/154, 851, 848, 849; 248/200.1, 262, 264, 267, 351, 352

(56) References Cited

U.S. PATENT DOCUMENTS

| 949,194 | A | * | 2/1910 | Myer | 403/362 |
| 1,094,134 | A | | 4/1914 | Dickerson | |
| 3,580,604 | A | | 5/1971 | Overend | |
| 4,148,373 | A | * | 4/1979 | Cline | 280/154 |
| 4,268,053 | A | * | 5/1981 | Toppins et al. | 280/851 |
| 4,316,678 | A | * | 2/1982 | Geppert | 403/362 |
| 4,591,178 | A | | 5/1986 | Mortvedt et al. | |
| 5,950,975 | A | | 9/1999 | Zieske | |
| 6,076,842 | A | * | 6/2000 | Knoer | 280/154 |

OTHER PUBLICATIONS

Author unknown, Spray Control Systems, Inc. catalog entitled "The Minimizer," dated 1994, cover and 1 page.

\* cited by examiner

*Primary Examiner*—Michael Mar
(74) *Attorney, Agent, or Firm*—McGarry Bair LLP

(57) ABSTRACT

A bracket assembly for mounting an accessory on a vehicle. The bracket assembly comprises a frame-mounting block, an accessory-mounting plate, and a rotation-resisting fastener. The frame-mounting block has an inner face adapted to abut a vehicle frame, an outer face spaced from the inner face, and a frame-mounting opening passing through the frame-mounting block transverse to the inner face for receiving a frame-mounting fastener. The accessory-mounting plate has an inner face oriented toward a vehicle frame when the bracket is mounted to the vehicle frame, spaced outwardly from the inner face of the frame-mounting block to accommodate a bolt head, and an accessory-mounting opening in the accessory-mounting plate for receiving a fastener for an accessory. The rotation-resisting fastener is mounted to the bracket and is adapted to resist rotation of the bracket about an axis passing through the frame-mounting opening.

22 Claims, 3 Drawing Sheets

OFFSET MOUNTING BRACKET

CROSS REFERENCE TO RELATED APPLICATION

This application claims the benefit of U.S. provisional patent application Serial No. 60/171,339, filed Dec. 21, 1999.

BACKGROUND OF THE INVENTION

1. Field of the Invention

The invention relates to a mounting bracket for mounting a post to the frame of a vehicle. In one of its embodiments, the invention relates to a mounting bracket for a vehicle fender bracket that is offset from a pre-drilled hole in the frame of the vehicle.

2. Description of the Related Art

Posts are mounted to the frame of a vehicle, such as truck-tractor or trailer, for the purpose of providing a mounting point and support for accessories such as quarter fenders, tandem mounts, and mud flaps. Prior art post-mounting methods have taken various forms. These prior art mounting methods include securing the post to the vehicle frame, directly in alignment with a hole in the vehicle frame, by passing a threaded bolt through the hole in the frame and into a threaded insert in the end of the post. The prior art methods also include securing the post to the frame by means of a flange or a plate which is welded to the end of the post, the flange or plate then being bolted to the vehicle frame. Other methods include adapting a post mounting plate to take advantage of existing bolts already attaching other equipment to the frame.

Also included in the prior art are applications using an offset post which is integral with a mounting tube, which, like the conventional straight post, has a threaded insert which receives a bolt passed through the vehicle frame.

The prior art methods have several disadvantages. The conventional straight post is limited to being attached at locations where a hole exists in the frame, or requires that a hole be drilled in the frame at the precise location desired for the post. The post with integral mounting flange or base plate again requires that the holes in the frame align with the location desired for mounting the post, and often requires a plurality of holes be drilled in the frame to align with the holes of the specific flange.

The offset post mounting method has the advantage of being flexible with respect to the location of the hole through the frame. However, there are applications that use differing posts, where an offset mounting is desired but offset posts for that application may not be common stock items. Having the offset mounting available for these new applications would require having an additional inventory of components available to the installer, in the form of straight and offset posts for each type of installation. Another disadvantage in the known offset post mounting methods is that the offset mounting is subject to movement about the axis of attachment of the offset mounting to the frame.

It would be advantageous to provide an post mount that provides the flexibility of offset mounting from an existing penetration in a vehicle frame while resisting rotation of the mounting about that penetration, and further reduces the need for a large inventory of specialized components for installation.

SUMMARY OF THE INVENTION

According to the invention, a bracket assembly for mounting an accessory on a vehicle comprises a bracket including a frame-mounting block and an accessory-mounting plate, and a rotation-resisting fastener. The frame-mounting block has an inner face adapted to abut a vehicle frame and an outer face spaced from the inner face and a frame-mounting opening passing through the frame-mounting block transverse to the inner face for receiving a fastener for mounting the bracket to a vehicle frame. The accessory-mounting plate has an inner face oriented toward a vehicle frame when the bracket is mounted to the vehicle frame and an outer face adapted to abut a vehicle accessory. The inner face of the accessory-mounting plate is spaced outwardly from the inner face of the frame-mounting block to accommodate a bolt head when the bracket is mounted to the vehicle frame. The accessory-mounting plate further has an accessory-mounting opening in for receiving a fastener for an accessory. A rotation-resisting fastener is mounted to one of the accessory-mounting plate and the frame-mounting block and adapted to resist rotation of the bracket about an axis passing through the frame-mounting opening.

In one embodiment of the invention, the accessory-mounting plate faces are parallel, and the frame-mounting block faces are parallel.

In a further embodiment of the invention, the bracket assembly includes a threaded opening for threadably receiving the fastener adapted to resist rotation.

In a further embodiment of the invention, the bracket assembly includes a frame-mounting fastener received within the frame-mounting opening for mounting the bracket to a vehicle frame.

In a further embodiment of the invention, the bracket assembly includes an accessory-mounting fastener received in the accessory-mounting opening for mounting an accessory to the bracket.

In a further embodiment of the invention, the accessory-mounting plate forms a circular seat for mounting the accessory.

In a further embodiment of the invention, the accessory-mounting opening is parallel to the frame-mounting opening.

Further according to the invention, a vehicle accessory and mounting bracket assembly for mounting on a vehicle frame comprising a vehicle accessory including an elongated post and a mounting as described according to any of the above embodiments of the invention. An accessory-mounting fastener is received in the accessory-mounting opening and fixed to the end of the vehicle accessory. A frame-mounting fastener is positioned in the frame-mounting opening for attaching the mounting bracket to a vehicle frame.

DESCRIPTION OF THE PREFERRED EMBODIMENT

Figure 1:
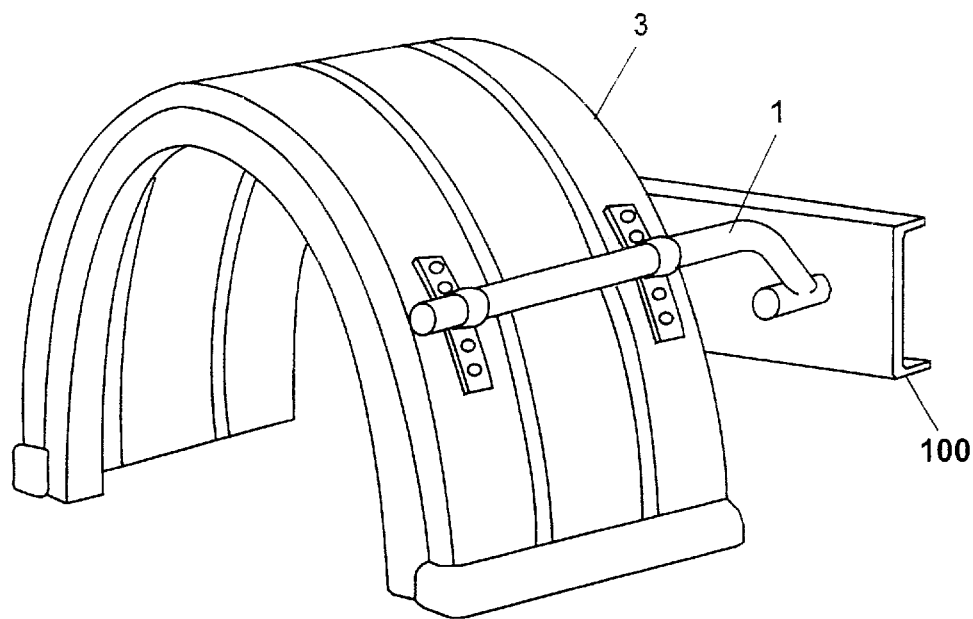
FIG. 1 is a perspective view of a prior art manner of mounting an offset post to a vehicle frame.
Figure 2:
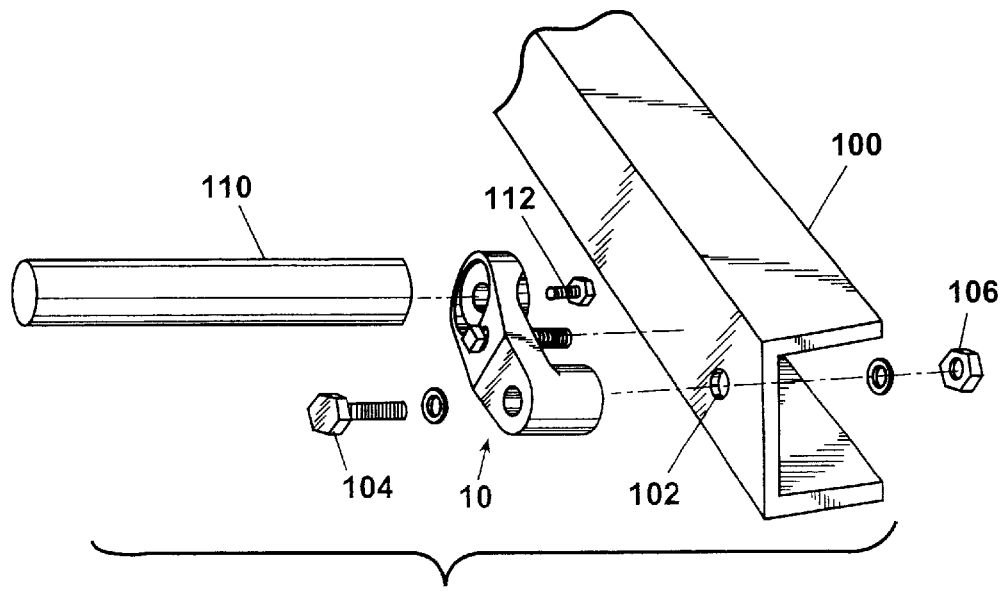
FIG. 2 is an exploded perspective view of a post mounted to a vehicle frame using an offset mounting bracket according to the invention.
Figure 3:
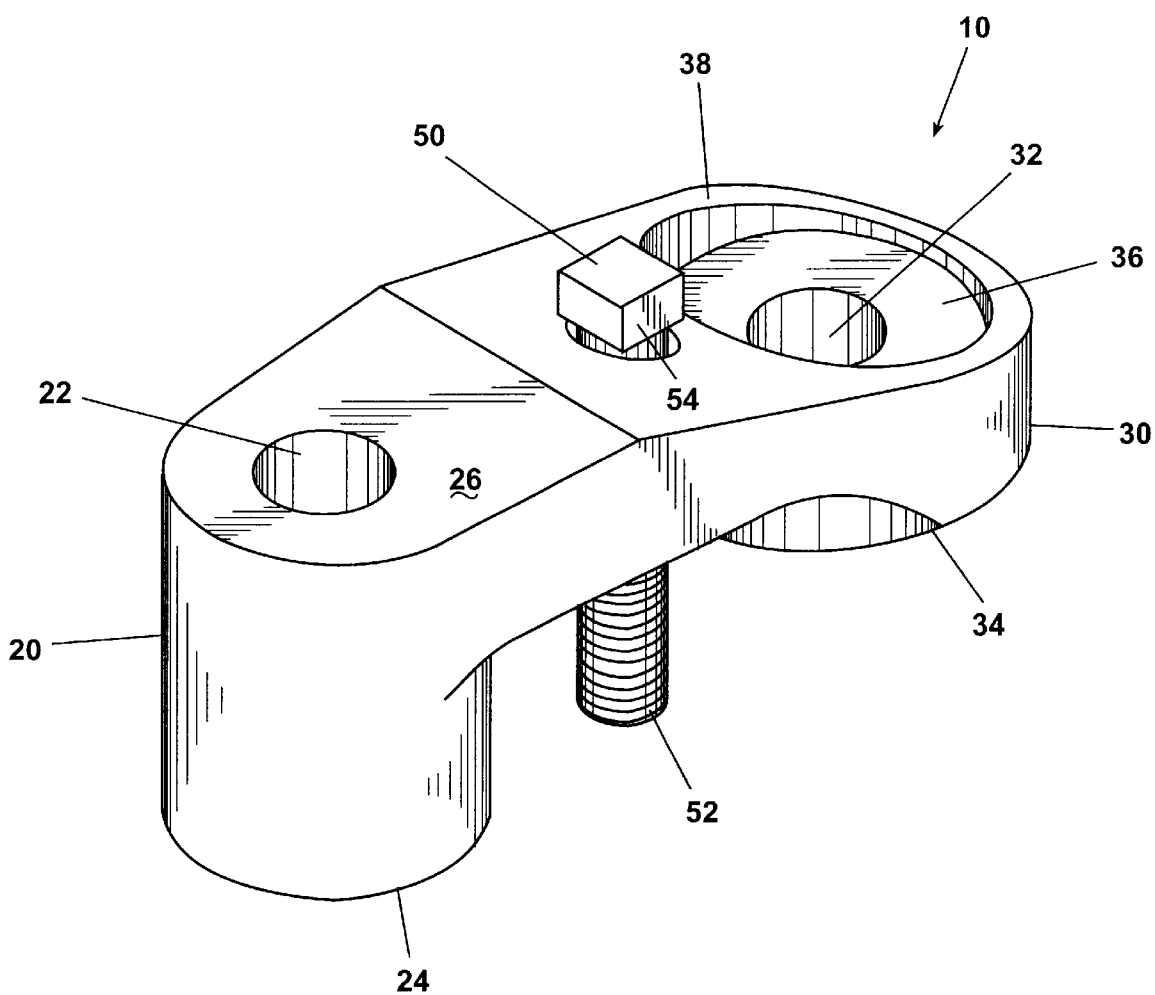
FIG. 3 is a perspective view of an offset mounting bracket according to the invention.
Figure 4:
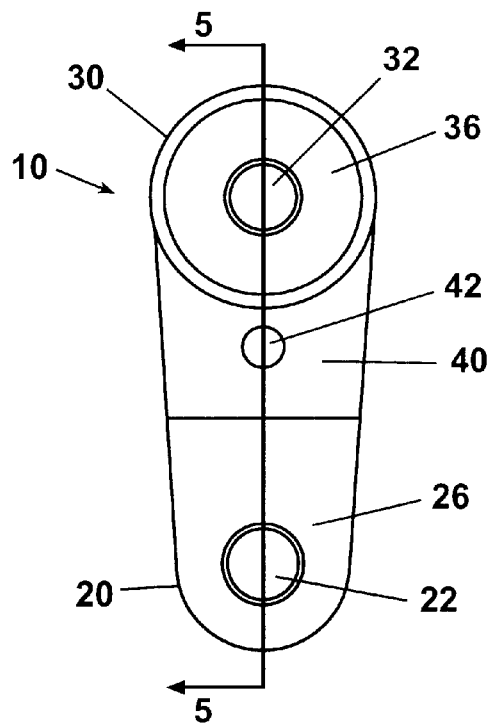
FIG. 4 is a plan view of the offset mounting bracket of FIG. 1.
Figure 5:
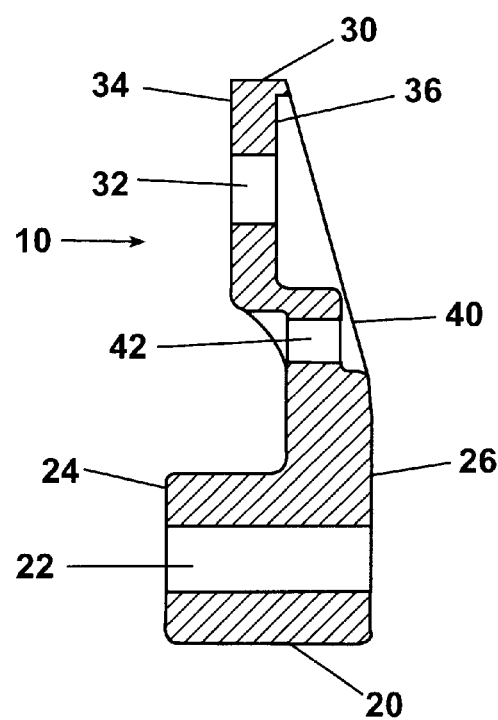
FIG. 5 is a cross-sectional view of the offset mounting bracket as taken through the line 5—5 of FIG. 4.

FIG. 1 depicts a prior art offset post mounting installation 1 attached to a vehicle frame 100, carrying a vehicle fender 3.

Referring now to FIGS. 2–5, FIG. 2 is an exploded perspective view of the relationship of an offset mounting bracket 10 according to the invention, mounting a straight post 110 to a vehicle frame.

The offset mounting bracket 10 according to the invention comprises two parallel generally cylindrical bodies 20, 30, each having an opening 22, 32 centered along the longitudinal axis of the respective cylindrical body 20, 30, the openings therefore being parallel.

The first cylindrical body 20 is generally longer than the second cylindrical body 30 and has a first body inner face 24 transverse to the longitudinal axis of body 20, adapted to mate to a vehicle frame 100. The first cylindrical body 20 also has a first body outer face 26, transverse to the longitudinal axis, and opposite the first body inner face 24.

The first cylindrical body 20 is rigidly attached to the second cylindrical body 30 by a flange 40. The flange 40 has a threaded aperture 42 therethrough, parallel to the first and second openings 22, 32. In a preferred embodiment, the first cylindrical body 20, second cylindrical body 30, and flange 40 are integrally formed, such as by casting, but bracket 10 can be manufactured by machining.

The second cylindrical body 30 has a second body inner face 34, the second body inner face 34 being parallel but non-coplanar with the first body inner face 24, offset a distance such that, when the first body inner face 24 is mounted to a vehicle frame, sufficient clearance remains between the second body inner face 34 and the vehicle frame to access the head of a bolt 112, the threaded portion of the bolt having been inserted through the second opening 32, from the side of the opening comprising the second body inner face 34. Consequently, the threaded portion of the bolt 112 protrudes from a second body outer face 36, opposite the second body inner face 34, which is transverse to the second opening 32. The second body outer face 36 is recessed from a perimeter 38 of the second cylindrical body 30, such that the second body outer face 36 is adapted to closely receive an end of a post 110 of a given diameter, in the manner of a seat.

The offset mounting bracket 10 is installed as follows. The first opening 22 is aligned with an aperture 102 in a vehicle frame 100, and a mounting bolt 104 and nut 106 are used to secure the offset mounting bracket 10 to the vehicle frame 100 through the first opening 22 and vehicle frame aperture 102. Prior to attaching the offset mounting bracket 10 to the vehicle frame 100, however, a bolt 112, as previously discussed, is inserted through the second opening 32 so that when the offset mounting bracket 10 is attached to the vehicle frame 100 the threaded bolt 112 projects through second opening 32, from second body outer face 36, away from the vehicle frame 100. While attachment of a post 110 is possible after the offset mounting bracket 10 is attached to the vehicle frame 100, it is preferable to mount the post 110 to the offset mounting bracket 10 prior to the installation of the offset mounting bracket 10 on the vehicle frame 100. In an alternative installation, it is foreseeable that an installer would use an existing aperture and bolt, mounting the offset mounting bracket 10 over an existing structure on the vehicle frame, as has been known in the prior art.

Upon the mounting of the offset mounting bracket 10 onto the vehicle frame 100, with the attached post 110 properly aligned, the offset mounting bracket 10 is secured in place by the tightening down of the mounting bolt 104. To further prevent movement of the offset mounting bracket 10, such as rotation about the first opening 22, a set screw 50 is threaded into the threaded aperture 42, in the flange 40 of the offset mounting bracket 10, and is of such a length that the end 52 of the set screw 50 will press against the vehicle frame before the head 54 of the set screw 50 bottoms out against the flange 40 of the offset mounting bracket 10. The offset mounting bracket 10 is thus further restricted from rotating about the first opening 22.

The offset mounting bracket 10 according to the invention overcomes the shortfalls of the prior art by providing the installer the advantage and the flexibility of securing a post 112 to a vehicle frame 100 where a conventional installation is not possible. The offset mounting bracket 10 allows for offset mounting about a fixed opening 102 through a frame 100, allows mounting of various post type supports, and still provides the option of using existing fasteners in place on the frame 100. The offset mounting bracket 10 requires only one penetration through the frame 100, while providing an additional measure by which the rotational position of the offset mounting bracket about that point can be fixed.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention.

What is claimed is:

1. A bracket assembly for mounting a fender or mudflap accessory on a vehicle, the bracket assembly comprising:

a bracket including a frame-mounting block and an accessory-mounting plate, the frame-mounting block having an inner face adapted to abut a vehicle frame and an outer face spaced from the inner face and a frame-mounting opening passing through the frame-mounting block transverse to the inner face for receiving a fastener for mounting the bracket to a vehicle frame, the accessory-mounting plate having an inner face oriented toward a vehicle frame when the bracket is mounted to the vehicle frame and an outer face adapted to abut a vehicle accessory, a thickness of the frame-mounting block between the inner and outer faces thereof being greater than a thickness of the accessory-mounting plate between the inner and outer faces thereof to provide the accessory-mounting plate with an inner face which is spaced outwardly from the inner face of the frame-mounting block to accommodate a bolt head of a bolt when the bracket is mounted to the vehicle frame, and an accessory-mounting opening in the accessory-mounting plate for receiving the bolt therethrough;

the bolt is adapted to be fastened to the accessory; and a rotation resisting element mounted to one of the accessory-mounting plate and the frame-mounting block and adapted to engage the vehicle frame to resist rotation of the bracket about an axis passing through the frame-mounting opening.

2. The bracket assembly of claim 1, wherein the accessory-mounting plate faces are parallel.

3. The bracket assembly of claim 1, wherein the frame-mounting block faces are parallel.

4. The bracket assembly of claim 1, wherein the rotation-resisting element is a screw and further comprising a threaded opening for threadably receiving the rotation resisting element.

5. The bracket assembly of claim 4, further comprising a frame-mounting fastener received within the frame-mounting opening for mounting the bracket to a vehicle frame.

6. The bracket assembly of claim 5, further comprising the accessory-mounting bolt received in the accessory-mounting opening for mounting an accessory to the bracket.

7. The bracket assembly of claim 4, flier comprising the accessory-mounting bolt received in the accessory-mounting opening for mounting an accessory to the bracket.

8. The bracket assembly of claim 1, wherein the accessory-mounting plate outer surface forms a circular seat for mounting the accessory.

9. The bracket assembly of claim 1, further comprising a frame-mounting fastener received within the frame-mounting opening for mounting the bracket to a vehicle frame.

10. The bracket assembly of claim 1, further comprising the accessory-mounting bolt received in the accessory-mounting opening for mounting an accessory to the bracket.

11. The bracket assembly of claim 1, wherein the accessory-mounting opening is parallel to the frame-mounting opening.

12. A vehicle fender or mudflap accessory and mounting bracket assembly for mounting on a vehicle frame, comprising:
    a vehicle accessory including an elongated post;
    a mounting bracket including
        a frame-mounting block having an inner face adapted to abut a vehicle frame, an outer face spaced from the inner face, and a frame-mounting opening passing through the frame-mounting block transverse to the inner face, and
        an accessory-mounting plate having an inner face oriented toward a vehicle frame when the mounting bracket is mounted to the vehicle frame, an outer face abutting an end of the vehicle accessory, and an accessory-mounting opening, a thickness of the frame-mounting block between the inner and outer faces thereof being greater than a thickness of the accessory-mounting plate between the inner and outer faces thereof to space the accessory-mounting plate inner face outwardly from the inner face of the frame-mounting block to accommodate a fastener head of a fastener when the mounting bracket is mounted to the vehicle frame;
    the accessory-mounting fastener being received in the accessory-mounting opening and fixed to the end of the vehicle accessory;
    a rotation-resisting element mounted to one of the accessory-mounting plate and the frame-mounting block for resisting rotation of the mounting bracket about an axis passing through the frame-mounting opening; and
    a frame-mounting fastener received in the frame-mounting opening for attaching the mounting bracket to a vehicle frame.

13. The vehicle accessory and mounting bracket assembly of claim 12, wherein the accessory-mounting plate faces are parallel.

14. The vehicle accessory and mounting bracket assembly of claim 12, wherein the frame-mounting block faces are parallel.

15. The vehicle accessory and mounting bracket assembly of claim 12 wherein the rotation-resisting element is a screw and the mounting bracket further comprising a threaded opening threadably receiving the rotation-resisting element.

16. The vehicle accessory and mounting bracket assembly of claim 12, wherein the accessory-mounting plate outer face forms a circular seat for mounting the accessory.

17. The vehicle accessory and mounting bracket assembly of claim 12, wherein the accessory-mounting opening is parallel to the frame-mounting opening.

18. A vehicle accessory and mounting bracket assembly for mounting on a vehicle frame according to claim 12 wherein the vehicle accessory is a fender.

19. A bracket assembly for mounting a fender or mudflap accessory on a vehicle, the bracket assembly comprising:
    a bracket comprising a frame mounting block and an accessory-mounting plate;
        the frame-mounting block having an inner face adapted to abut a vehicle fame and an outer face spaced from the inner face and a frame-mounting opening passing through the frame-mounting block transverse to the inner face for receiving a fastener for mounting the bracket to a vehicle frame;
        an accessory-mounting plate having an inner face oriented toward a vehicle frame when the bracket is mounted to the vehicle frame and an outer face adapted to abut a vehicle accessory, a structure of the frame-mounting block between the inner and outer faces thereof and a structure of the accessory-mounting plate between the inner and outer faces thereof providing the accessory-mounting plate with an inner face which is located between a plane defined by the inner face of the frame-mounting block and a plane defined by the outer face of the frame-mounting block and positioned to accommodate a bolt head of a bolt when the bracket is mounted to the vehicle frame, and an accessory-mounting opening in the accessory-mounting plate for receiving the bolt therethrough;
    the bolt adapted to be threaded into the a fastener for an accessory; and
    a rotation resisting element mounted to one of the accessory-mounting plate and the frame-mounting block and adapted to engage the vehicle frame to resist rotation of the bracket about an axis passing through the frame-mounting opening.

20. A bracket assembly for mounting a fender or mudflap accessory on a vehicle according to claim 19 and further comprising a recessed seat in the outer face of the accessory mounting plate for receiving one end of the accessory.

21. A bracket assembly for mounting a fender or mudflap accessory on a vehicle according to claim 19 wherein the rotation resisting element is a screw that is threaded into the accessory mounting plate.

22. A bracket assembly for mounting a fender or mudflap accessory on a vehicle according to claim 19 wherein a thickness of the frame-mounting block between the inner and outer faces thereof is greater than a thickness of the accessory-mounting plate between the inner and outer faces thereof.

* * * * *